L. J. WOGENSTAHL.
DIRIGIBLE HEADLIGHT.
APPLICATION FILED APR. 24, 1914.
1,214,736.
Patented Feb. 6, 1917.
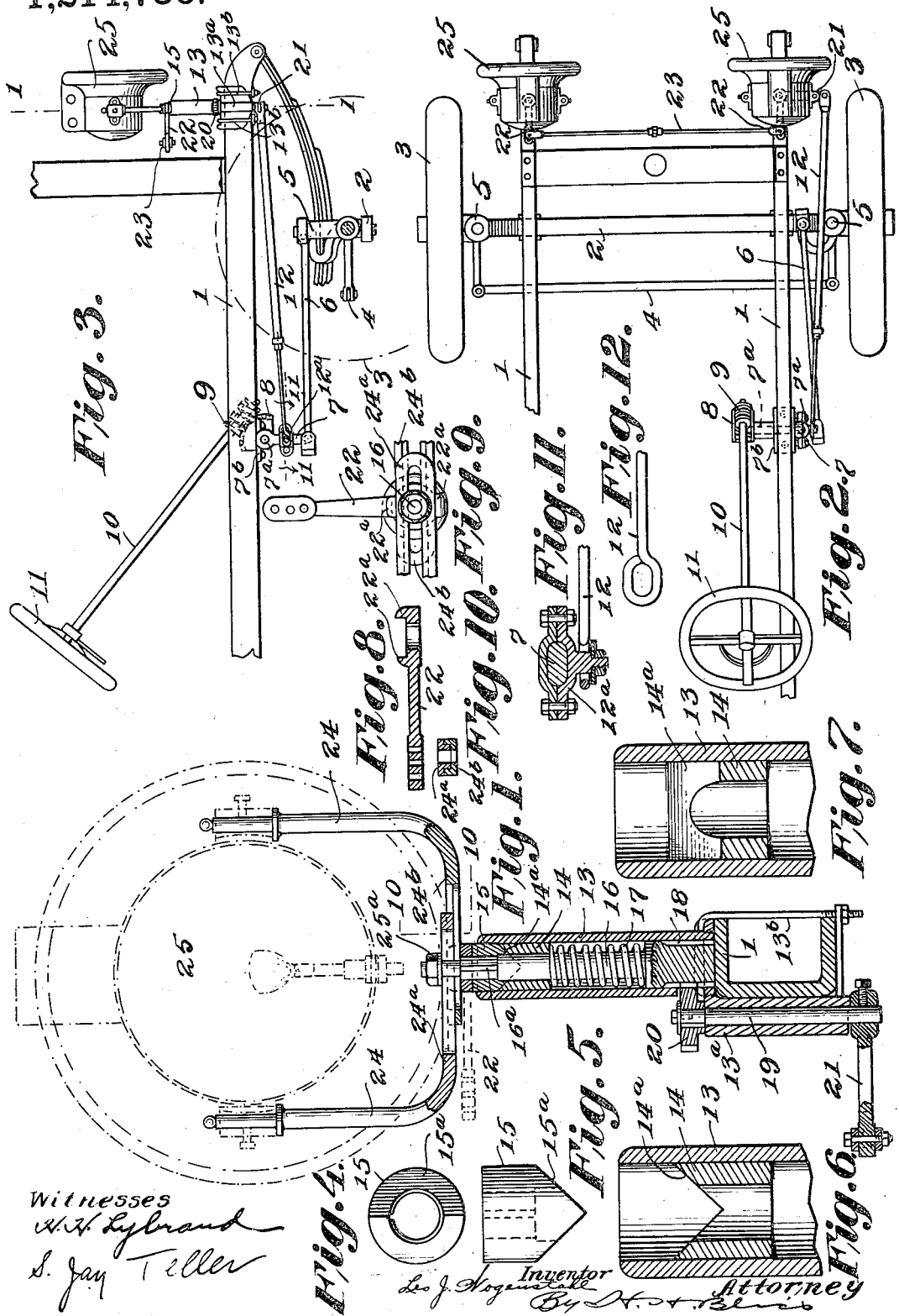

UNITED STATES PATENT OFFICE.

LEO JOSEPH WOGENSTAHL, OF SAN ANTONIO, TEXAS, ASSIGNOR TO AUTOMATIC SEARCH LIGHT COMPANY, OF PHOENIX, ARIZONA, A CORPORATION OF ARIZONA.

DIRIGIBLE HEADLIGHT.

1,214,736.     Specification of Letters Patent.     Patented Feb. 6, 1917.

Application filed April 24, 1914. Serial No. 834,226.

*To all whom it may concern:*

Be it known that I, LEO J. WOGENSTAHL, a citizen of the United States, residing at San Antonio, in the county of Bexar and State of Texas, have invented certain new and useful Improvements in Dirigible Headlights, of which the following is a specification, reference being had therein to the accompanying drawing.

One of the objects of the invention is to provide in combination lamp carrying spindles having means which cause them to rise and fall when they are turned and spindle driving gearing so positioned and constructed that the rising and falling movement is not interfered with.

Another object is to provide an improved mechanism for preventing oscillatory vibration of the lamp spindle, the said mechanism constantly causing the rising and falling movement above referred to.

A further object is to provide an improved mounting for the lamp carrying arms which permits the adjustment of both of them bodily laterally or the adjustment of one of them with respect to the other to provide for lamps of different sizes.

Further objects will be apparent from the following specification and claims.

In the drawings, Figure 1 is a view showing in central vertical section a lamp and its intermediate attachments, taken on the line 1—1 of Fig. 3. Fig. 2 is a top plan view of part of the body frame, the front running gear and the lamp system of an automobile embodying my improvements. Fig. 3 is a side view of some of the parts shown in Fig. 2. Fig. 4 is a bottom view of one of the elements which controls the movements of the lamp bracket. Fig. 5 is a side elevation of the part shown in Fig. 4. Fig. 6 is a fragmentary vertical sectional view showing on an enlarged scale some of the parts shown in Fig. 1. Fig. 7 is a vertical sectional view taken at right angles to the view appearing in Fig. 6. Fig. 8 is a detailed sectional view of one of the operating levers. Fig. 9 is a fragmentary plan view showing parts of the lamp carrying arms. Fig. 10 is a cross-sectional view taken along the line 10—10 of Fig. 1. Fig. 11 is a fragmentary sectional view taken along the line 11—11 of Fig. 3. Fig. 12 is a detail view showing the end of the operating rod.

A part of the framework of the automobile body is indicated, the showing being sufficient to illustrate the manner of connecting together the body, the front running gear and the lamp system.

1, 1 indicates the side sills of the main frame; 2 the axle of the front wheels 3, 3; and 4 the cross connecting rod which joins the crank arms of the steering knuckles.

5, 5 indicate the pivot axes around which the wheels vibrate when steering.

6 indicates the connecting rod which extends backward from the steering knuckles to the devices for manually effecting the steering.

7 is a vertically arranged crank at the outer end of the rock shaft 7ª which is mounted in a suitable bracket 7ᵇ on the main frame. This shaft 7ª carries a worm gear segment 8. With this meshes the worm 9 of the steering shaft 10 which is shown as extending up in an ordinary manner at an inclination toward the seat of the driver and is provided at the upper end with a hand wheel.

12 is a connecting rod or link that extends forward from the crank arm 7 for the purpose of transmitting manually exerted power for the adjusting and controlling of the positions of the parts of the lamp system. The rear end of the rod is provided with an elongated eye which receives a stud or boss on the clamp 7ª secured to the arm 7. By means of the elongated eye a limited amount of lost motion is provided.

There are two lamps each indicated by 25 and which so far as concern many of their details may be of any of the ordinary or well known forms.

In my apparatus each lamp is mounted in a peculiarly constructed bracket system constructed as follows: 13 indicates a tubular standard or upright which is secured to a sill bar 1 of the frame. This upright or standard can be cast with a downward extending tubular bracket piece 13ª which is preferably arranged on the outside of the frame sill. Or, if preferred, the tubular parts 13 and 13ª can be made separately and secured together in any preferred way. In the upper part of the tubular standard 13 there is placed a thimble 14. This thimble preferably consists of a separate piece of hardened steel. It has a tight fit with the interior of the tubular upright and is forced into its position under pressure. It has a central cylindrical aperture and its upper surface is cut away to form a V-shaped recess 14ª, as shown in Fig. 6. In the upper end of the standard part 13 is loosely fitted a plug-like part 15, the lower end of which is formed to be V-shaped in vertical cross section, as shown at 15ª, Fig. 5. The V-shaped projecting bottom part of this plug fits snugly into the recess 14ª in the upper part of the thimble or shoulder piece 14.

16 is a shaft arranged vertically within the standard 16. It passes through the central vertical aperture in the abutment block 14, and at its upper end it has a key 16ª which locks it to the plug part 15. This shaft 16 at its lower end is preferably enlarged or is provided with an elongated cylindrical part 18 in which are formed gear teeth. 17 is a spring interposed between this part 18 at the lower end of the shaft and the stationary thimble or shoulder piece 14. 19 is a short vertical shaft mounted in the tubular standard 13ª. At its upper end it has a pinion 20 whose teeth mesh with those on the wheel-like part 18 of shaft 16. At its lower end the shaft at 19 has attached to it the inner end of a crank arm 21, the latter at its outer end being pivotally connected to the aforesaid operating rod 12.

The upper end of the part of the shaft 16 supports a fork, the vertical legs of which are indicated by 24. Each of these is carried by or supported from a horizontal arm, one indicated by 24ª and the other by 24ᵇ. The arm 24ª is grooved longitudinally, and the arm 24ᵇ is rabbeted in such way that the central part fits in the groove in the part 24ª. These two arms are thus held in line, but they can be adjusted laterally as required and after adjustment they can be clamped rigidly in position by means of the nut 25ª, the shaft 16 being shouldered to form a reduced shank which passes through the slots in the arms 24ª and 24ᵇ and the nut 25ª engaging with the upper end of this reduced shank.

Each of the lamps with its set of attachments is similar to the other with the exception that but one of them, preferably the right hand one, is provided with the operating gears and lever. The above description of one of the sets of devices is sufficient for both. They are connected by a rod 23 extending across the front of the machine and pivotally joined at each end to a crank arm 22 extending backward from the shaft 16. Each arm 22 is provided with ears 22ª, 22ª which embrace one of the arms 24 and thus serve to lock the arm 22 against angular movement with respect to the other arms. The two ears 22ª, 22ª also serve to prevent any spreading of the two parts of the respective arms 24, 24. Preferably each arm 22 is provided with several apertures. In its rear outer end the rod 23 can be connected in any one of these apertures as desired. It sometimes happens that the lamp brackets are set so close to the radiator that there is not room for the movement of the arm 22 when the arms are of full length. In such a case the rod 23 can be connected in the inner holes, and the rear outer ends of the arms 22 can be cut off.

From the above description of parts and their arrangement it will be seen that when the driver operates the starting mechanism to turn the front wheels 3 in either direction he correspondingly turns the lamp system. When power is transmitted through the rod 12 and the crank 21 to the shaft 19, the latter in turn, through the pinion 20 and wheel 18, commences to rotate the vertical shaft 16. This is accompanied by a slight raising of the shaft because of the cam action of the inclined surfaces 14ª and 15ª. This results in an increasing of the compression of spring 17 and holds all of the relatively movable parts adjacent to the lamp firmly in position and prevents rattling and vibrating. Not only does the spring hold the parts against vertical vibration, but it also holds them against oscillatory vibration. The cam action of the two surfaces 14ª and 15ª tends at all times to return the lamp supporting parts to their normal central positions and the result is that this turning tendency is transmitted to the gears and to all of the operating connections. Any possible lost motion in any of the joints or connections is taken up; and as all of the parts are transmitting force, relative vibration between any of them is prevented.

It will be noted that I have combined with the automatic-centering vibration-preventing parts which cause rising and falling of the lamp spindle, a gear operating means which does not interfere with the vertical movement. Gear 18 is made long so that it can rise and fall and still remain in mesh with the pinion 20 which is fixed against vertical movement. In this way I am enabled to combine all of the advantages of the rising and falling spindle and of the gear drive.

The adjustable lamp carrying arms 24, 24 constitute an important feature of my invention. As before pointed out the arms can be adjusted longitudinally of themselves (or transversely of the automobile) but are held against turning relatively to each other. It frequently happens because of proximity to the radiator or to the mud guard that a lamp is so positioned that it cannot be turned. When this occurs the entire lamp can be moved bodily outward or inward according to the necessities of the case and brought into such position that free turning can be effected. Furthermore the arms are relatively adjustable so as to be adapted for lamps of different sizes.

What I claim is:

1. In a vehicle of the class described, the combination with the frame, the steering mechanism, the lamp, and the rotatable and vertically movable lamp-carrying spindle, of the spur gear on the spindle in permanent working relation therewith as it moves vertically, a second spur gear mounted in fixed position on the main frame and held in permanent mesh relation with the spur gear on the spindle, and operating connections between the second gear and the steering mechanism and mounted in fixed positions on the frame.

2. In a vehicle of the class described, the combination with the frame, the steering mechanism, the lamp, and the rotatable and vertically movable lamp-carrying spindle, of the spur gear on the spindle having relatively elongated spur teeth and held in fixed working relation with the spindle, a second spur gear mounted in fixed position on the main frame and having relatively short teeth held in permanent mesh relation with the gear on the spindle, and operating connections between the fixed gear and the steering mechanism and mounted in fixed positions on the frame.

In testimony whereof, I affix my signature in presence of two witnesses.

LEO JOSEPH WOGENSTAHL.

Witnesses:
J. M. McIlhanny,
R. C. Wade.